Patented June 4, 1935

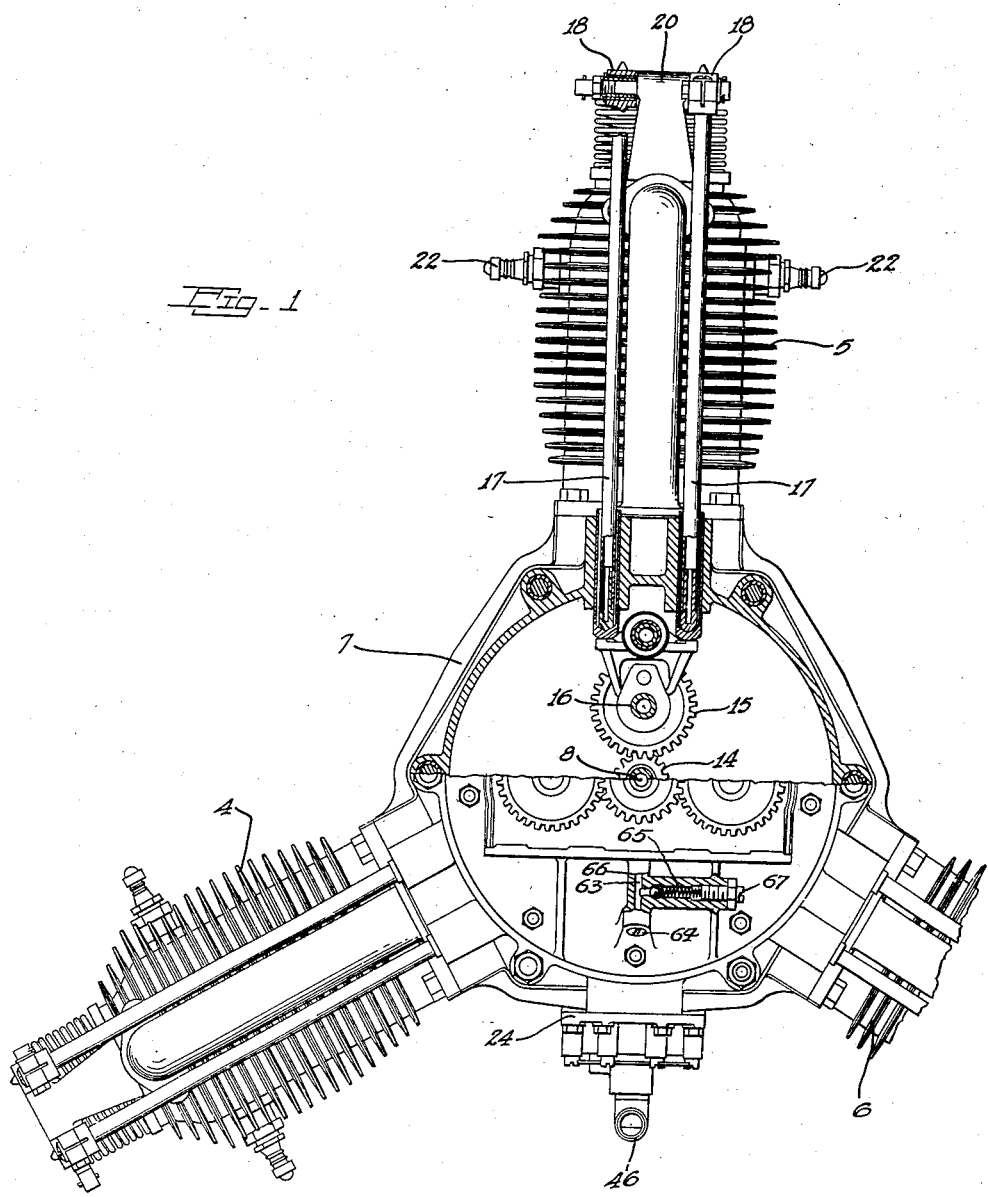

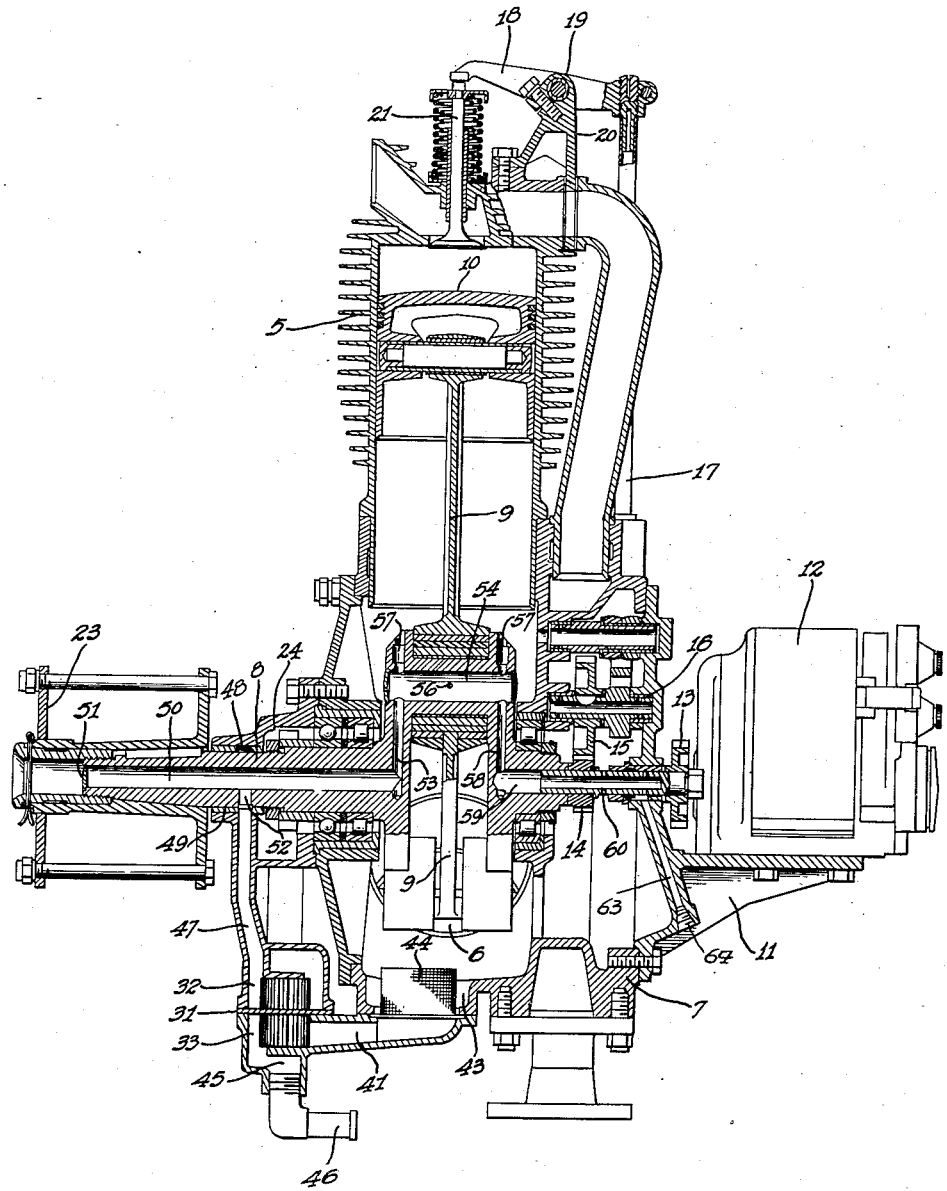

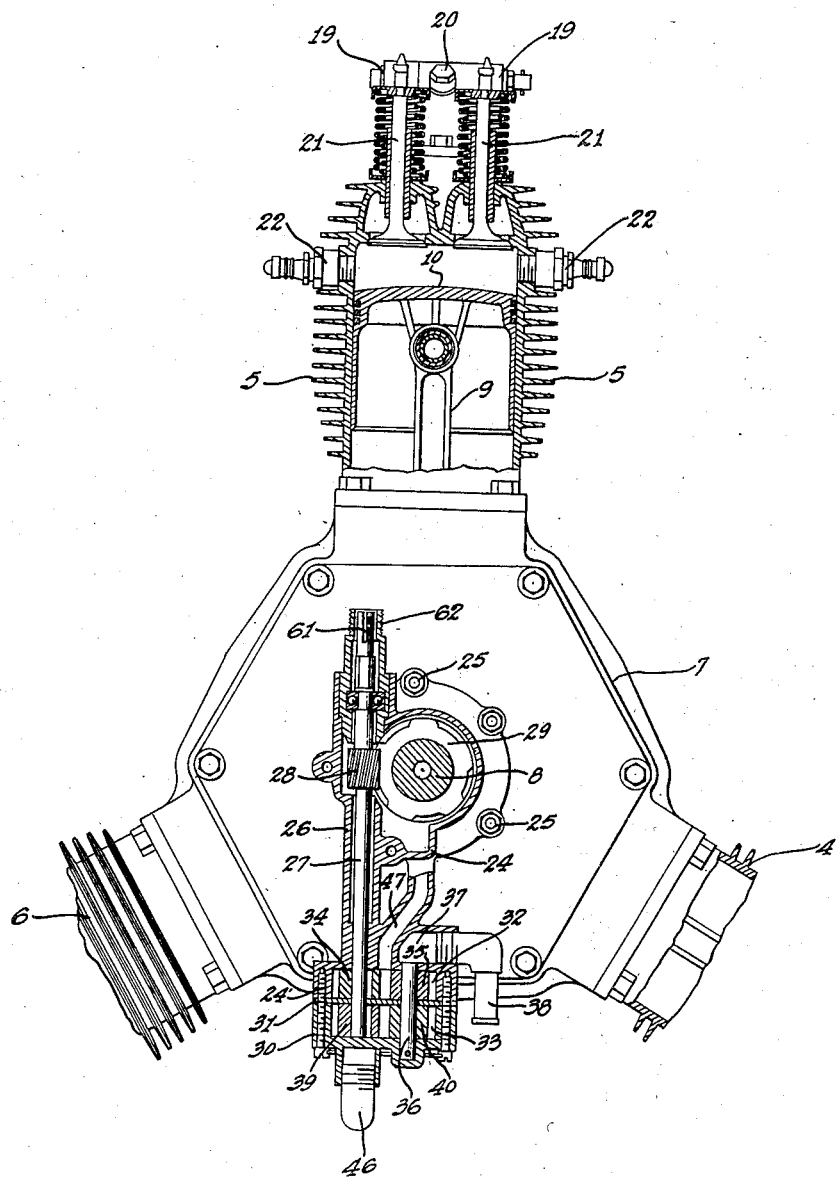

2,003,563

UNITED STATES PATENT OFFICE 2,003,563

INTERNAL COMBUSTION ENGINE

Otto E. Szekely, Holland, Mich.

Application February 14, 1931, Serial No. 515,682

1 Claim. (Cl. 184—6)

This invention relates to internal combustion engines and particularly to internal combustion engines of the character used with aircraft and the like wherein it is desired to have an engine having a high ratio of horse power to the weight thereof and the invention is shown in connection with a so-called radial engine of this type.

In engines of this character it is necessary that various parts be effectively lubricated to insure proper operation thereof and it is therefore the salient object of my invention to lubricate an engine in a positive manner to increase the efficiency and prolong the life thereof without materially increasing the weight thereof.

Usually tubing is employed to distribute the lubricant to the various operating parts of the engine and valves have been provided to control the flow of the lubricant but such an arrangement is subject to disadvantages, such as, breakage of the tubing and improper operation of the valves. Therefore, another object is to provide an engine embodying lubricant passages through which the lubricant may be directed to the operating parts in a manner such that the distribution of the lubricant may be properly regulated without the use of valves or other regulating devices.

Further objects are to provide an engine wherein an uninterrupted stream of lubricant will be circulated; to insure circulation of the lubricant by a simple and novel device of unit construction; to incorporate in the device a drive for auxiliary devices associated with the engine such as a tachometer, speedometer, distributor, pump, or the like; and to provide an arrangement which will be of simple and economical manufacture and efficient operation.

In the selected embodiment of the invention illustrated in the accompanying drawings Fig. 1 is a view, partly in elevation and partly in section, of the rear end of an engine embodying my invention;

Fig. 2 is a vertical longitudinal section of the engine; and

Fig. 3 is a view, partly in elevation and partly in section, of the front end of the engine.

The engine illustrated in the accompanying drawings is of the three-cylinder radial type and while I have illustrated a three-cylinder engine it is to be understood that this invention might be incorporated in an engine embodying any number of cylinders. The cylinders are respectively indicated by 4, 5, and 6 and are circumferentially spaced apart about the crank case 7. Journaled in the crank case in the usual manner is the crank shaft 8 having pitmans 9 connected to the throw thereof and to the pistons 10 reciprocal in the respective cylinders. The engine illustrated in the accompanying drawings includes a shelf 11 having a magneto 12 or other suitable ignition device thereon, which device is operable from the crank shaft through a suitable connection 13. Also arranged on the crank shaft is a gear 14 meshing with a gear 15 mounted on the shaft 16, and this arrangement operates through the suitable devices to actuate the push rods 17 for motivating the rockers 18 pivotally mounted at 19 on the brackets 20 on the respective cylinders to operate the usual intake and exhaust valves 21, and in the illustrated embodiment of the invention these valves are arranged in the cylinder heads to provide a valve-in-head motor. The explosive fuel mixture introduced into the explosion chambers of the cylinders through the inlet valves is ignited by the spark plugs 22 which are electrically connected with the ignition device 12 and following an explosion the burned mixture passes out through the exhaust valves. As is well understood, the explosions in the chambers of the cylinders motivate the pistons and the movement of the pistons is transmitted through the pitmans to the throws on the crank shaft to rotate this shaft. On the forward end of the crank shaft, extended beyond the crank case 7, power take-off means in the nature of the propeller hub 23 or the like may be secured. The device as thus far described forms no particular part of my invention which, as has been stated heretofore, particularly relates to lubricating systems for internal combustion engines and my invention is herein shown in association with an engine constructed as previously described. My improved lubricating system embodies a housing 24 secured to the front plate of the engine by bolts 25 or the like or it may be integral with front plate of the engine. The housing includes a vertically extending portion 26 having bearings therein in which a shaft 27 is journaled. The shaft has a gear 28 fast thereon which meshes with a gear 29 fast on the crank shaft 8. Thus, when the crank shaft is rotated movement is imparted to the shaft 27, the lower end of which extends into the gear pump housing comprising an upper section 24' and a lower section 30 between which a plate 31 is arranged to divide the gear pump housing into two chambers 32 and 33. The upper section of the gear pump housing is an integral part of the casting of which the vertically extending portion 26 is also a part and the housing 24, as referred to herein, encloses not only these parts but also the lower section of the gear pump and the inlet thereto leading from the crank case, as will be explained hereinafter and as clearly illustrated in Fig. 2. Fast on the shaft 27 in the chamber 32 is gear 34 meshed with a gear 35 rotatable on the shaft 36. Communicating with the chamber 32 is a passage 37 terminating in a nipple 38 to which one end of a pipe line may be connected. Fast on the shaft 27 within the chamber 33 is a gear 39 meshed with a gear 40 rotatable on the shaft 36. Communicating with the chamber 33 is an inlet passage 41 (Fig. 2) directed to a sump 43 in the bottom of the crank case 7, the inlet of which is covered by a screen 44. The passage 41 is provided in a part of the housing 24. The outlet portion of the chamber 33 communicates with a nipple 46 to which a pipe line or the like may be secured. The pipe lines connected to the nipples 46 and 38 respectively lead to and from a suitable lubricant reservoir or tank and if desired these nipples may be directly connected to such a tank. When the shaft 27 is rotated the gears 34 and 35 are set in motion and the lubricant is drawn through the nipple 38 and passage 37 into contact with the gears and is whirled around the periphery thereof and pushed up through the passage 47 into the groove 48 in the bearing sleeve 49. The passage 47 is provided by parts integral with the housing 24. In the crank shaft is an axially disposed passage 50 closed at one end by a cap 51 and in the crank shaft is an opening 52 which establishes communication between the groove 48 and the passage 50. At its inner end the passage 50 communicates with a passage 53 which leads to the hollow interior 54 of the throw on the crank shaft and a lubricant passage 56 conducts oil to the bearings for the pitmans connected to this throw and into recesses such as 57. Some lubricant will pass between the cheeks of the crank shaft and pitman bearings onto the walls of the cylinder to lubricate the cylinder and piston therein. From the hollow interior 54 a passage 58 extends to a passage 59 in the crank shaft and out through lubricant outlet openings 60 to supply lubricant to the valve operating gears and the like. Since there will be a head on the lubricant it will be forced through passages such as the foregoing which, as will be noted, are entirely included in parts of the motor, and at no time does the lubricant pass through tubing or the like. The need for objectionable valves and the like is entirely avoided since to control the supply of lubricant it is merely necessary to regulate the operation of the gear pump. After the oil has passed over the bearings it flows into the crank case and into the sump 43 and thence through the screen 44 into the passage 41 and the action of the gears 39 and 40 will create a suction which will withdraw the lubricant from this passage and force it out through the passage 45 and nipple 46 back to the tank so that it may again be withdrawn therefrom in a manner previously described. There will be sufficient lubricant in the system to always maintain a supply thereof in the sump 43 and likewise there will be sufficient lubricant maintained in the tank to insure a supply. Thus, breaks in the suction or air bubbles in the line may be entirely avoided which will make for much more efficient lubrication of the engine. In order that a predetermined lubricant pressure may be maintained I provide a conduit 63, one end of which is closed by a plug 64 and the other end of which communicates with the passage 59. A chamber 65 (Fig. 1) is provided and communication between this chamber and the passage 63 is controlled by a spring-pressed ball 66. The spring tension on the ball may be varied by adjusting the screw 67 and this tension determines the pressure at which communication will be established between the chamber 65 and the passage 63 and in this manner I am enabled to regulate the lubricant pressure, for when communication to the chamber 65 is established the volume of the lubricating passages will be increased with the resultant decrease in lubricant pressure.

Since my lubricating system is arranged in the forward end of the engine it may be advantageously used to drive certain devices associated therewith as, for example, a tachometer, a speedometer, a distributor or, should this device be used in connection with an engine of the Diesel type, a fuel pump may be operated by the shaft 27. In the present instance the upper end of the shaft is slit as indicated at 61 and a threaded nipple 62 is provided to facilitate the attaching of the protection for a flexible shaft or the like which may be attached to the slit end 61 of the shaft.

While I have illustrated and described a selected embodiment of my invention it is to be understood that this is capable of variation and modification and I therefore do not wish to be limited to the precise details set forth but desire to avail myself of such changes and alterations as fall within the purview of the following claim.

I claim:

In an internal combustion engine including a crank shaft having a lubricant passage therein, a crank case having an opening in the lower wall thereof and operating parts having lubricant distributing passages therein communicating with the lubricant distributing passage in the crank shaft to receive lubricant therefrom, a housing mounted at one end of the crank case and including a casting secured to the bottom of the crank case and having an opening therein aligned with the opening in the bottom of the crank case, said casting having a pump chamber therein and a passage leading from the opening to said pump chamber, a gear pump in said pump chamber, said housing including a second casting having a pump chamber therein, said housing also including a partition separating said pump chambers, a gear pump in the pump chamber in the second casting, said second casting including a part providing an outlet passage leading from the pump chamber in said casting to a port disposed at the periphery of said crank shaft, means providing a groove about the periphery of the crank shaft and aligned with said port, said crank shaft having an opening therein extending between said groove and the lubricant distributing passage therein, said second named casting also including a part providing a shaft bearing, a shaft journaled in said shaft bearing and having a movement receiving gear thereon, a gear of each of said gear pumps being mounted on said shaft, and a gear on said crank shaft and meshed with said movement receiving gear whereby rotation of said crank shaft is transmitted through said shaft to said gear pumps, said gear pumps being connected in serial relation and in the operation thereof withdrawing lubricant from said crank case and forcing the lubricant through said outlet passage and said groove, opening, and lubricant distributing passage in said crank shaft for distribution through the lubricant distributing passages in said operating parts.

OTTO E. SZEKELY.